United States Patent [19]
Yokel

[11] 3,803,934
[45] Apr. 16, 1974

[54] POWER TRANSMISSION WITH HELICAL TOOTH TAPERED GEARS ON INPUT AND OUTPUT SHAFTS

[75] Inventor: Edward C. Yokel, Racine, Wis.

[73] Assignee: Twin Disc, Incorporated, Racine, Wis.

[22] Filed: Nov. 29, 1972

[21] Appl. No.: 310,576

[52] U.S. Cl............................... 74/361, 74/417
[51] Int. Cl............................................ F16h 3/14
[58] Field of Search............. 74/361, 458, 417, 416, 74/462, 459.5

[56] References Cited
UNITED STATES PATENTS
| | | | |
|---|---|---|---|
| 3,570,319 | 3/1971 | Arnold | 74/361 |
| 2,106,958 | 2/1938 | Pettit, Jr. | 74/361 |
| 3,520,205 | 7/1970 | Halibrand | 74/417 X |

Primary Examiner—Benjamin W. Wyche
Assistant Examiner—John Reep
Attorney, Agent, or Firm—James E. Nilles

[57] ABSTRACT

A power transmission for transmitting power from an input shaft and to an output shaft which is inclined at an angle to the input shaft, said transmission having means including a second shaft for driving the inclined output shaft in the reverse direction with equal power to that in which it is driven in the other direction. The transmission includes a clutch means for the input shaft and the second shaft and also includes meshing gears between the input, second and output shafts and which gears are in constant mesh with one another and selectively engaged by the clutches. The input shaft carries a helical, tapered pinion gear while a reversing lay-shaft carries a helical cylindrical gear, both gears are in constant mesh with a larger tapered, helical gear.

6 Claims, 7 Drawing Figures

POWER TRANSMISSION WITH HELICAL TOOTH TAPERED GEARS ON INPUT AND OUTPUT SHAFTS

BACKGROUND OF THE INVENTION

This invention pertains to power transmissions which include gear combinations that are selected by hydraulically operated clutches, and find particular utility in marine gears for example, where the power output shaft is at an inclined angle to the power input and other shafts, the inclined power output shaft driving the propeller shaft of the boat, for example.

The present invention is an improvement over the transmission shown in the U.S. Pat. No. 3,570,319 issued Mar. 16, 1971 entitled "Power Transmission" and assigned to an assignee common with this application.

The transmission of the prior art U.S. Pat. No. 3,570,319 was limited however, in the amount of horsepower it could trasnmit, and this limitation was due for one thing, to the amount of under-cutting necessary in the pinion gear located on the input power shaft, and furthermore, this particular gear could not have the required tooth area for transmitting heavy loads and still permit the use of standard gears in such a transmission.

SUMMARY OF THE INVENTION

The present invention provides a power transmission having a power input shaft and a second shaft which is parallel to the input shaft, each of the shafts having a gear rotatable thereon and connectible with its respective shaft by means of a clutch carried by the shaft; a third power output shaft is inclined at an angle to the other two shafts and it has a tapered gear fixed thereto which is in constant mesh with the gears of the other two shafts. The arrangement is such that either of the clutches can be selectively engaged to provide driving power to the output shaft in one direction of rotation or the other.

A more specific aspect of the present invention relates to a transmission of the above type in which the gear that is located on the power input shaft is a tapered, helical gear, the second shaft is located in an offset relation to the power input shaft and the gear on this second shaft is of the straight, that is cylindrical, helical type. The gear located on the inclined output shaft is then of the tapered type which is in constant mesh with the gears on the input and second shafts.

With the specific gear arrangement provided by the present invention, the gear on the power input shaft can be made with less under-cut, with more tooth width across its top rear side, and the transmission can transmit higher loads.

These and other objects and advantages of the present invention will appear hereinafter as this disclosure progresses, reference being had to the accompanying drawings.

DESCRIPTION OF A PREFERRED EMBODIMENT

The power transmission of the present invention is driven by a power source such as an internal combustion engine (not shown) which delivers power to a flywheel 2 located in the flywheel housing 3, the flywheel in turn delivering power to the power transmission PT. Power is then delivered by the transmission to the propeller shaft 4, which shaft is inclined at an angle and extends downwardly to drive other associated parts, such as a propeller (not shown) of a boat (not shown).

Figure 1:
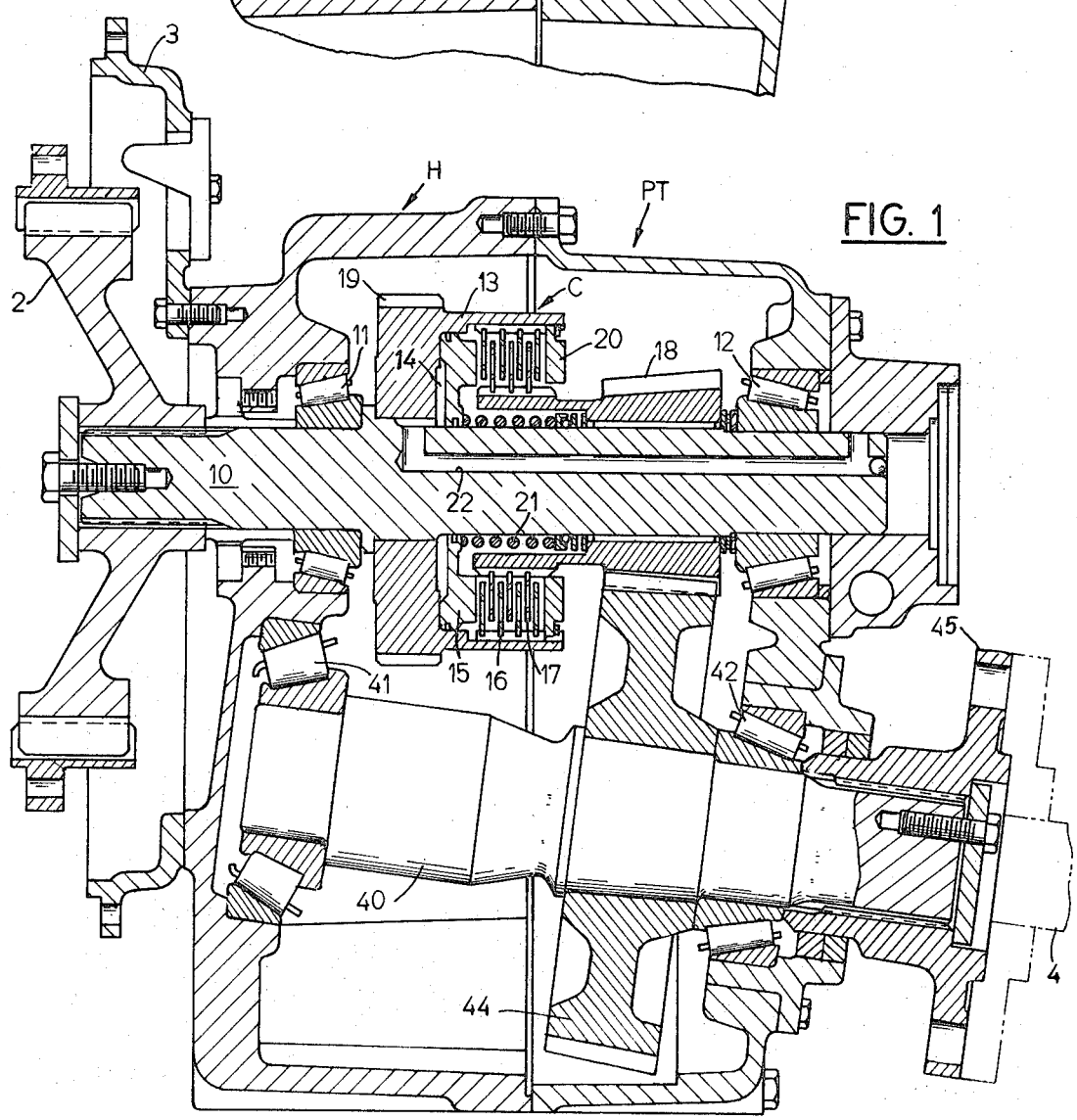
FIG. 1 is a longitudinal, cross sectional view through the power transmission of the present invention.
Figure 3:
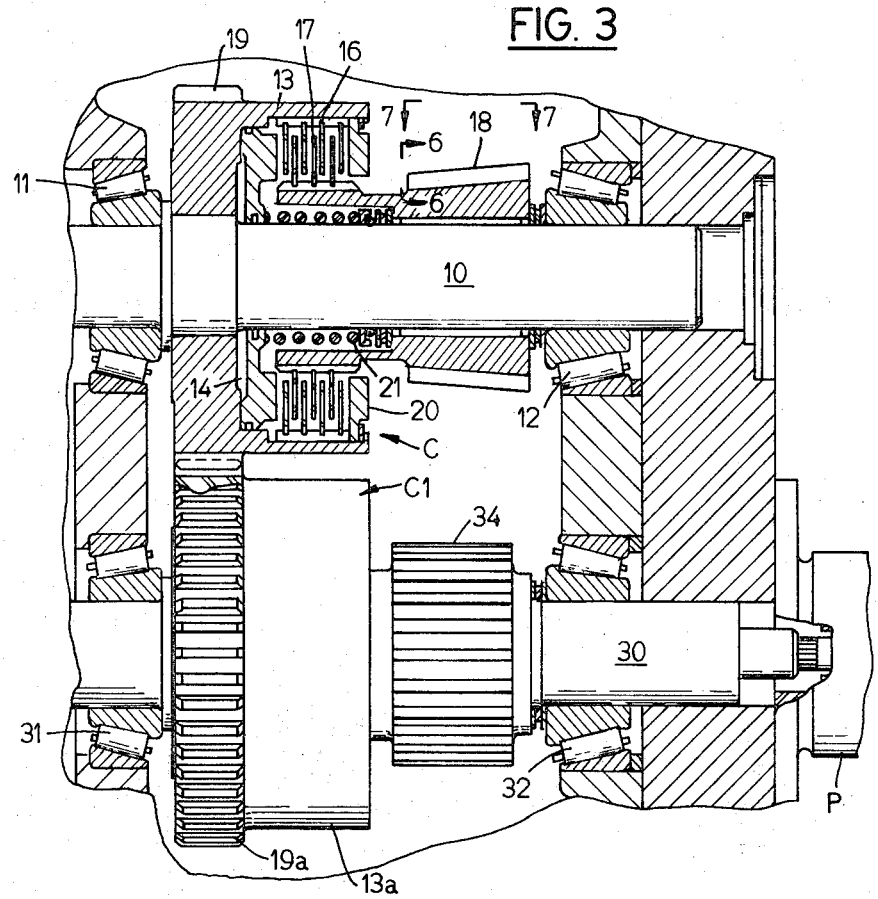
FIG. 3 is a sectional view taken along line 3—3 in FIG. 4.

The power transmission is shown in detail in FIG. 1 and includes a housing H in which the power input shaft 10 is rotatably journalled by the anti-friction bearing assemblies 11 and 12. A clutch means C is mounted on the shaft 10 and includes a drum 13 which is fixed to the shaft 10 for rotation therewith. The clutch means is of the hydraulically actuated, interleaved friction plate type and includes a clutch actuating chamber 14 which can be pressurized with fluid in the known manner to cause the piston 15 to extend and thereby clamp up the interleaved friction plates 16 and 17 which are fixed respectively to the interior of the drum 13 and to a bevel gear 18. The gear 18 is freely journalled on the shaft 10 and when the clutch means C is engaged due to clamping action of the piston, the gear 18 is then drivingly rotated. Gear 18 is of the helical, tapered type having a taper converging toward said clutch means.

The drum of the clutch includes a gear portion 19 around its periphery for constant mesh with another clutch means C1 to be described. The clutch C also includes a back-up plate 20 fixed to the drum 13 and a return spring 21 for positively disengaging the clutch when the pressure is removed from the actuating chamber 14. Pressure fluid is introduced into the clutch actuating chamber 14 via the passage means 22 which is formed by rifle drilling or the like in the shaft 10. This pressure fluid comes from a pressure source such as the fluid pump P (FIG. 2) located on the housing H and driven by a shaft 30.

Figure 2:
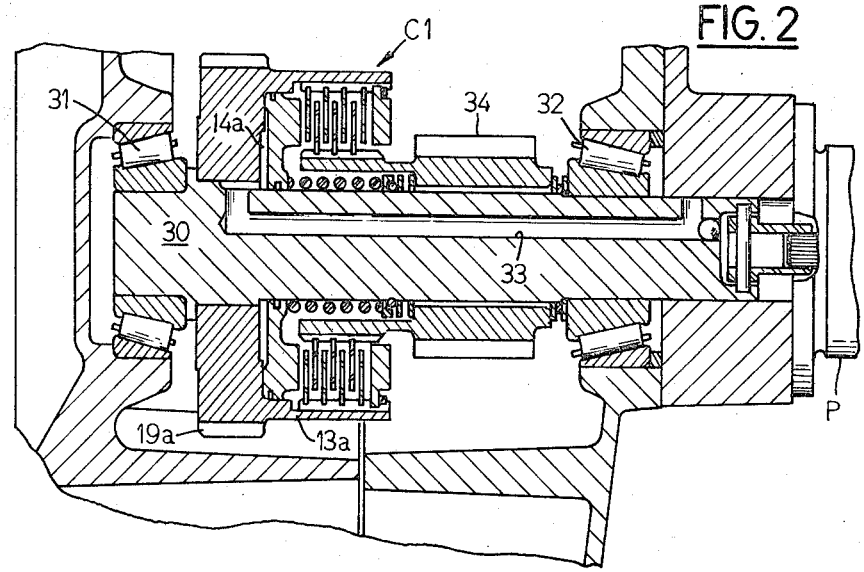
FIG. 2 is a cross sectional view taken along line 2—2 in FIG. 4.

Referring particularly to FIG. 2, the transmission also includes the second shaft 30 which is journalled in the housing by means of the anti-friction bearing assemblies 31 and 32. This shaft 30 has the clutch means C1, which is generally similar to the clutch means of shaft 10, and a detailed description of it is not believed to be necessary nor desirable. It is believed sufficient to say that pressure fluid from pump P is introduced to the clutch actuating chamber 14a of clutch means C1, via the fluid passage 33. The gear 34 of clutch C1 is of the helical type, and is in constant mesh with a gear 44 to be described.

In this manner, clutch means C1 is connected between the second shaft 30 and its gear 34 for disconnectibly transmitting power from the second shaft to the gear 34. Power input to clutch C1 is from the portion 19 of clutch C, that is through gears 19 and 19a on the clutch drums.

Shafts 10 and 30 are arranged within the housing in parallel relationship to one another, and the drums 13 and 13a of clutch means C and C1, respectively, are in constant engagement with one another via their gears 19 and 19a, respectively. Shafts 10 and 30 are thereby simultaneously rotated, and the clutches C and C1 are selectively engaged to furnish power, respectively through their gears 18 or 34, and to a third shaft 40 (FIG. 1) now to be described.

The transmission also includes a third or output shaft 40 which is journalled in the housing H by means of anti-friction bearing means 41 and 42 and it will be noted that this shaft 40 is positioned at an incline to parallel shafts 10 and 30. The amount of inclination may vary, but has been shown in this particular installation as being on the order of approximately seven degrees of the horizontal.

Figure 5:
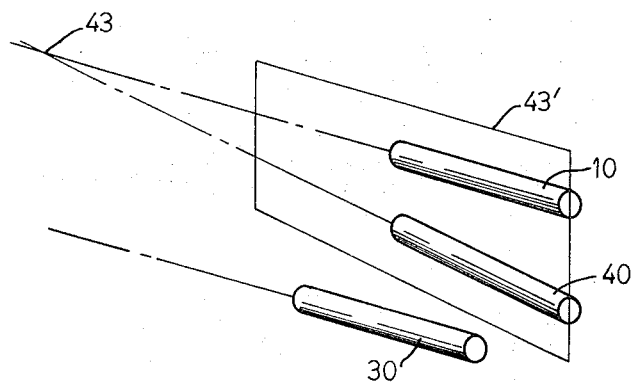
FIG. 5 is a schematic diagram showing the position of the shaft axes.

As shown in FIG. 5, the point of intersection of shaft axes 10 and 40 is located at 43. Shafts 10 and 40 are both located in the same plane 43', which plane is parallel to shaft 30, and therefore, the axes of shafts 10 and 30 never intersect.

The output shaft 40 has a connecting flange 45 for attachment to the propeller shaft 4 (FIG. 1). The output shaft also has a relatively large, tapered helical gear 44 fixed thereto for rotation therewith and this tapered gear is in constant mesh with both gears 18 and 34.

Depending on which clutch C or C1 is engaged to transmit power to its respective gear 18 or 34, the output shaft 40 will be driven in one direction or another. With the present arrangement, power can be transmitted to shaft 40 for either direction of rotation of shaft 40, and the full power to be transmitted to shaft 40 in the reverse as well as the forward directions of boat travel.

RECAPITULATION

The power transmission of the present invention can transmit power to an inclined power output shaft, driving the output shaft in either direction of rotation with equal amounts of power, the input and second shafts are parallel to one another and all three shafts have constant mesh gears for transmitting power between them.

Figure 4:
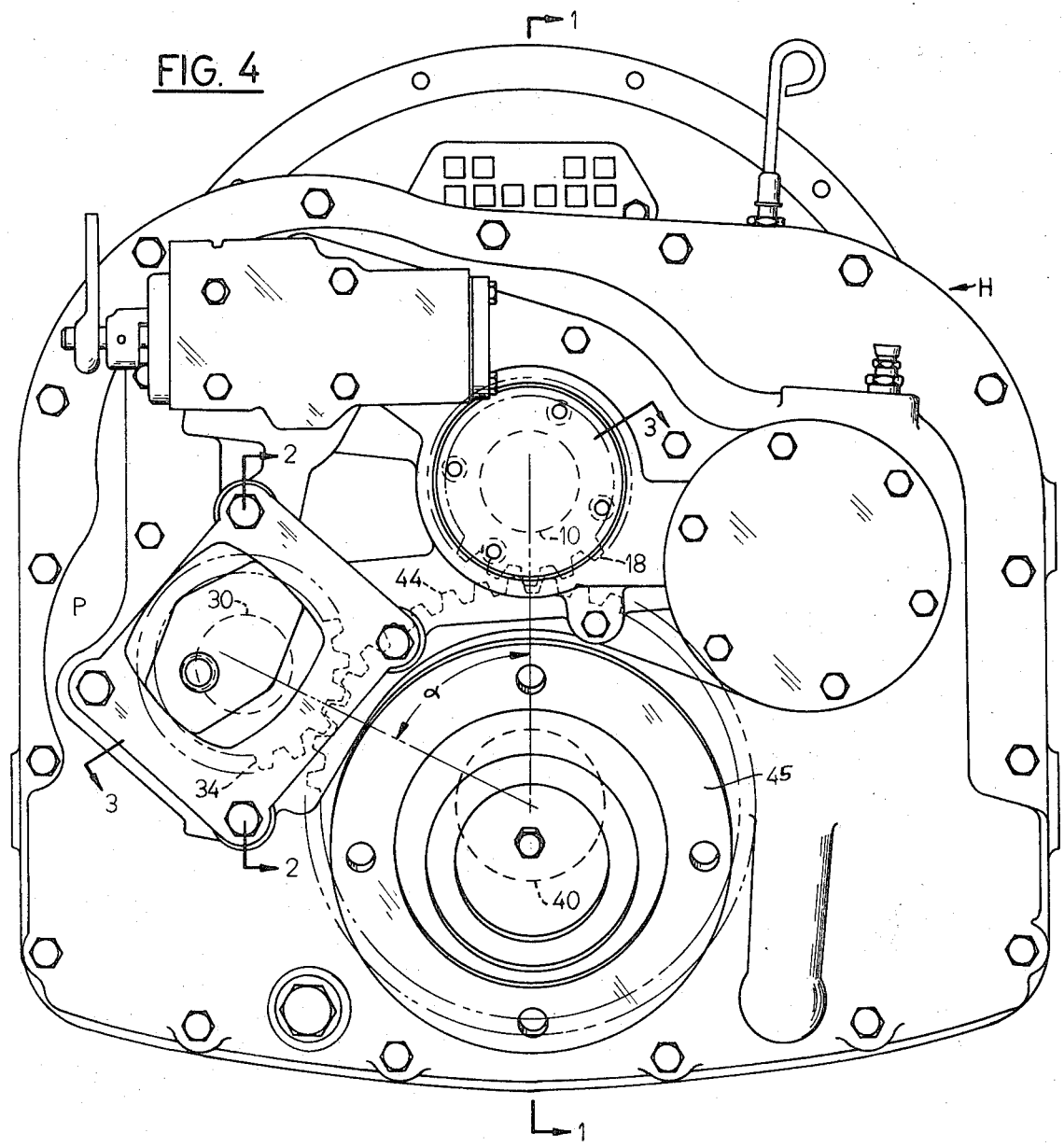
FIG. 4 is a rear elevational view of the transmission shown in FIG. 1.

The present invention provides a marine transmission capable of transmitting higher horsepower than certain prior art transmissions such as shown in U.S. Pat. No. 3,570,319. As a result, the angle α between shafts 10 and 30 (FIG. 4) is greater than the angle between the corresponding shafts in the said U.S. Pat. No. 3,570,319.

Figure 7:
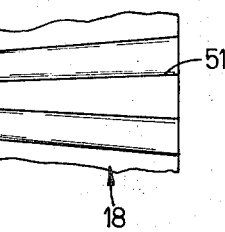
FIG. 7 is an enlarged, fragmentary view taken along line 7—7 in FIG. 3.
Figure 6:
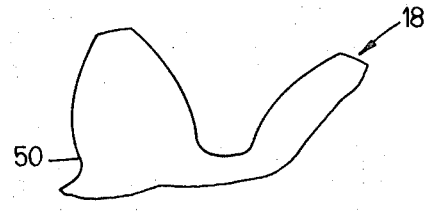
FIG. 6 is an enlarged, fragmentary view taken along line 6—6 in FIG. 3.

It will be noted that the pinion helical gear 34 located on the laterally offset shaft 30, is of the cylindrical type rather than being of the tapered type. Furthermore, the helical pinion gear 18 on power shaft 10 is of the tapered type, which permits its front end to be of smaller diameter. These gears are in constant mesh with the large tapered, helical gear 44 on the output shaft. I have found that with this particular gear type and arrangement in transmissions of larger size and for delivering more horsepower than that possible with the transmission of the said U.S. Pat. No. 3,570,319, less undercut is necessary at 50 (FIG. 6) on the smaller front end of the gear teeth on gear 18. Furthermore, a wider tooth at the top of the teeth of the rear end 51 (FIG. 7) of gear 18 is possible. This permits larger capacity of the gear by having longer teeth and more tooth working area on the teeth, resulting in the ability to carry more horsepower.

I claim:

1. A power transmission comprising, a housing, a power input shaft rotatably mounted in said housing, a helical tooth tapered gear rotatably mounted on said input shaft, and clutch means connected between said input shaft and said helical tooth tapered gear for disconnectibly transmitting power from said input shaft to its said gear, said tapered gear having a taper converging toward said clutch means, a second shaft rotatably mounted in said housing and parallel to said input shaft and having a helical tooth cylindrical gear rotatably mounted thereon, clutch means connected between said second shaft and its gear for disconnectibly transmitting power from said second shaft to its gear, said clutch means each having a toothed portion in constant mesh with one another for simultaneous rotation by said input shaft, a power output shaft rotatably mounted in said housing and being inclined to said input and second shafts, a helical tooth tapered gear fixed to said output shaft for constant mesh with said gears of said input and second shafts, said input and output shafts being in the same plane, whereby either of said input shaft or said second shaft may be drivingly connected with said output shaft through their respective gears.

2. A power transmission comprising, a housing having means for attachment to the flywheel housing of a power source, a power input shaft rotatably mounted in said housing for receiving power from said power source, a helical tooth tapered pinion gear rotatably mounted on said input shaft, and fluid actuated clutch means connected between said input shaft and its said gear for disconnectibly transmitting power from said input shaft to its said gear, said tapered gear having a taper converging toward said clutch means, a second shaft rotatably mounted in said housing and parallel to said input shaft and having a helical tooth cylindrical pinion gear rotatably mounted thereon, fluid operated clutch means connected between said second shaft and its gear for disconnectibly transmitting power from said second shaft to its gear, said clutch means each having a toothed portion in constant mesh with one another for simultaneous rotation by said input shaft, a power output shaft rotatably mounted in said housing and being inclined to said input and second shafts, a helical tooth tapered gear fixed to said output shaft for constant mesh with said gears of said input and second shafts, said input and output shafts being in the same plane, whereby either of said input shaft or said second shaft may be drivingly connected with said output shaft through their respective gears.

3. The transmission set forth in claim 1 further characterized in that each of said clutch means includes a drum fixed to its respective shaft, and said toothed portions are formed on their respective drums, whereby said drums are in constant engagement with one another and are simultaneously rotated.

4. The transmission set forth in claim 2 further characterized in that each of said clutch means includes a drum fixed to its respective shaft, and said toothed portions are formed on their respective drums, whereby said drums are in constant engagement with one another and are simultaneously rotated.

5. The transmission described in claim 3 further characterized in that said clutch means are of the interleaved friction plate type, some of said plates being attached to their respective drum and others of said plates being attached to their respective gears.

6. The transmission described in claim 4 further characterized in that said clutch means are of the interleaved friction plate type, some of said plates being attached to their respective drum and others of said plates being attached to their respective gears.

* * * * *